United States Patent
Waldman et al.

(10) Patent No.: US 10,955,562 B2
(45) Date of Patent: Mar. 23, 2021

(54) GPS COMPUTATION CYCLING

(71) Applicant: ENTIT SOFTWARE LLC, Sunnyvale, CA (US)

(72) Inventors: Dori Waldman, Yehud (IL); Eli Mordechai, Modin (IL); Ran Snir, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 469 days.

(21) Appl. No.: 15/544,639

(22) PCT Filed: Jan. 29, 2015

(86) PCT No.: PCT/US2015/013587
§ 371 (c)(1),
(2) Date: Jul. 19, 2017

(87) PCT Pub. No.: WO2016/122542
PCT Pub. Date: Aug. 4, 2016

(65) Prior Publication Data
US 2018/0011197 A1 Jan. 11, 2018

(51) Int. Cl.
| | | |
|---|---|---|
| *G01S 19/34* | (2010.01) | |
| *H04W 52/02* | (2009.01) | |
| *G01S 19/09* | (2010.01) | |

(52) U.S. Cl.
CPC .............. *G01S 19/34* (2013.01); *G01S 19/09* (2013.01); *H04W 52/0219* (2013.01)

(58) Field of Classification Search
CPC .............. G01S 19/34; H04W 52/0219; H04W 52/0209; H04W 52/0212; H04W 4/02–029; H04W 4/06–08
See application file for complete search history.

(56) References Cited

U.S. PATENT DOCUMENTS

| | | | |
|---|---|---|---|
| 8,294,573 B2 | 10/2012 | Mermet et al. | |
| 8,712,441 B2 | 4/2014 | Haney | |
| 8,774,851 B2 | 7/2014 | Mirbaha et al. | |
| 8,805,404 B1 | 8/2014 | Yang et al. | |
| 9,332,551 B2 * | 5/2016 | Wells | H04W 52/0219 |
| 9,467,806 B2 * | 10/2016 | Omar | G01S 5/0294 |
| 9,838,266 B2 * | 12/2017 | Bruins | H04W 52/0209 |

(Continued)

FOREIGN PATENT DOCUMENTS

WO  WO-2014118533 A1  8/2014

OTHER PUBLICATIONS

International Searching Authority, International Search Report and Written Opinion; PCT/US2015/013587; dated Oct. 26, 2015; 9 pages.

(Continued)

*Primary Examiner* — Cassi J Galt

(57) ABSTRACT

A method for cycling GPS computations is described in which, at a beginning of a cycle, N computing devices are determined to be members of a device group. At each of N points within the cycle: a target device of the N computing devices is instructed to compute its target location data; another member of the device group is instructed to refrain from computing its other location data; target location data is received from the target device; and the target location data is transmitted to each other member of the device group.

20 Claims, 10 Drawing Sheets

(56) References Cited

U.S. PATENT DOCUMENTS

| | | |
|---|---|---|
| 2005/0275587 A1 | 12/2005 | Siegel |
| 2005/0288036 A1 | 12/2005 | Brewer |
| 2009/0054078 A1 | 2/2009 | Golds |
| 2009/0278738 A1 | 11/2009 | Gopinath |
| 2011/0009127 A1* | 1/2011 | Spjuth .................... H04L 67/18 455/456.1 |
| 2012/0026971 A1 | 2/2012 | Khandelia et al. |
| 2013/0005362 A1 | 1/2013 | Borghei |
| 2014/0274031 A1* | 9/2014 | Menendez ........ H04W 52/0209 455/426.1 |
| 2017/0359696 A1* | 12/2017 | Yasuda ................... H04W 4/08 |

OTHER PUBLICATIONS

Liu, L. et al., Design and Implementation of Android Phone Based Group Communication and Navigation System, Apr. 21-23, 2012, 4 pages http://ieeexplore.ieee.org/xpl/articleD.

* cited by examiner

MACHINE-READABLE STORAGE MEDIUM 400

DEVICE GROUP MEMBER DETERMINING INSTRUCTIONS TO DETERMINE, AT A BEGINNING OF A CYCLE, THAT N COMPUTING DEVICES ARE MEMBERS OF A DEVICE GROUP 404

INSTRUCTION DISTRIBUTION INSTRUCTIONS TO DISTRIBUTE, DURING THE CYCLE, INSTRUCTIONS AMONG THE N COMPUTING DEVICES THAT CAUSE EACH OF THE N DEVICES TO PERFORM ONE GPS COMPUTATION 408

LOCATION DATA RECEIVING INSTRUCTIONS TO RECEIVE, DURING THE CYCLE, FIRST LOCATION DATA COMPUTED BY A FIRST DEVICE OF THE DEVICE GROUP 412

LOCATION DATA TRANSMITTING INSTRUCTIONS TO TRANSMIT, DURING THE CYCLE, FIRST LOCATION DATA COMPUTED TO A SECOND DEVICE OF THE DEVICE GROUP 416

GPS COMPUTATION CYCLING

BACKGROUND

Many smart phones, tablets and other mobile computing devices include Global Positioning System (GPS) functionality. GPS systems in such devices provide location data by receiving and decoding time and position signals transmitted by orbiting satellites. To provide continuously updated location data, a GPS system and its associated antenna and processor repeatedly receive, decode and process such signals. In some examples, GPS systems repeat such signal reception processing at sample rates of, for example, 1 Hz., 5 Hz. and 20 Hz.

The power consumed by operating GPS system components and the related data processing may limit the battery life of computing devices. In some devices, such power consumption of GPS components is greater than the power consumed by any other sensor in the device. Additionally, when a GPS system is active, a device may be prevented from entering into a battery-saving sleep state.

BRIEF DESCRIPTION OF THE DRAWINGS

FIG. 4 is a block diagram of a non-transitory machine-readable storage medium containing instructions for cycling GPS computations according to an example of the present disclosure.

DETAILED DESCRIPTION

As described above, a mobile computing device may utilize GPS functionality to generate location data that corresponds to a geographic location of the device. In some examples, mobile computing devices with GPS functionality may utilize this location data with location-based services that provide information and related services relevant to the location of the device. For example, mobile computing devices may provide GPS location data to a navigation service that provides turn-by-turn directions to a desired destination. The navigation service may comprise instructions that, when executed by at least one processor of an associated computing device or system, provide such directions to mobile computing devices and other types of computing devices with GPS functionality.

In providing navigation assistance, a computing device or system associated with a navigation service may receive user input of a desired destination. At least one processor of the computing device or system may execute navigation service instructions to determine a route from the current location of the user's device to the desired destination. The route may include travel along multiple roads, thoroughfares, highways, and the like, along with at least one turn and/or exit. Where multiple routes to a destination are available, the application may enable the user to select a desired route.

While utilizing a navigation service during travel to a desired destination, a computing device may continuously operate its GPS components to provide updated location data to the service. As noted above, such operation of a GPS receiver along with the continuous processing of GPS data and corresponding computation of a current location can consume significant power. Particularly where the computing device is a mobile computing device running on battery power, such operation of the GPS components and associated processing can negatively impact battery life.

The present disclosure describes examples of a server, method and non-transitory machine-readable storage medium for cycling GPS computations among members of a device group to reduce the power consumed by the devices. As described in more detail below, in some examples two or more GPS-enabled computing devices may be traveling along a common route. The present disclosure includes examples of determining that certain devices are members of a device group based on the routes being followed such devices. GPS computations may then be cycled among members of the group, and location data shared among the group members. As used herein, the term "GPS computation" refers to the process of computing a geographic location using GPS data.

Figure 1:
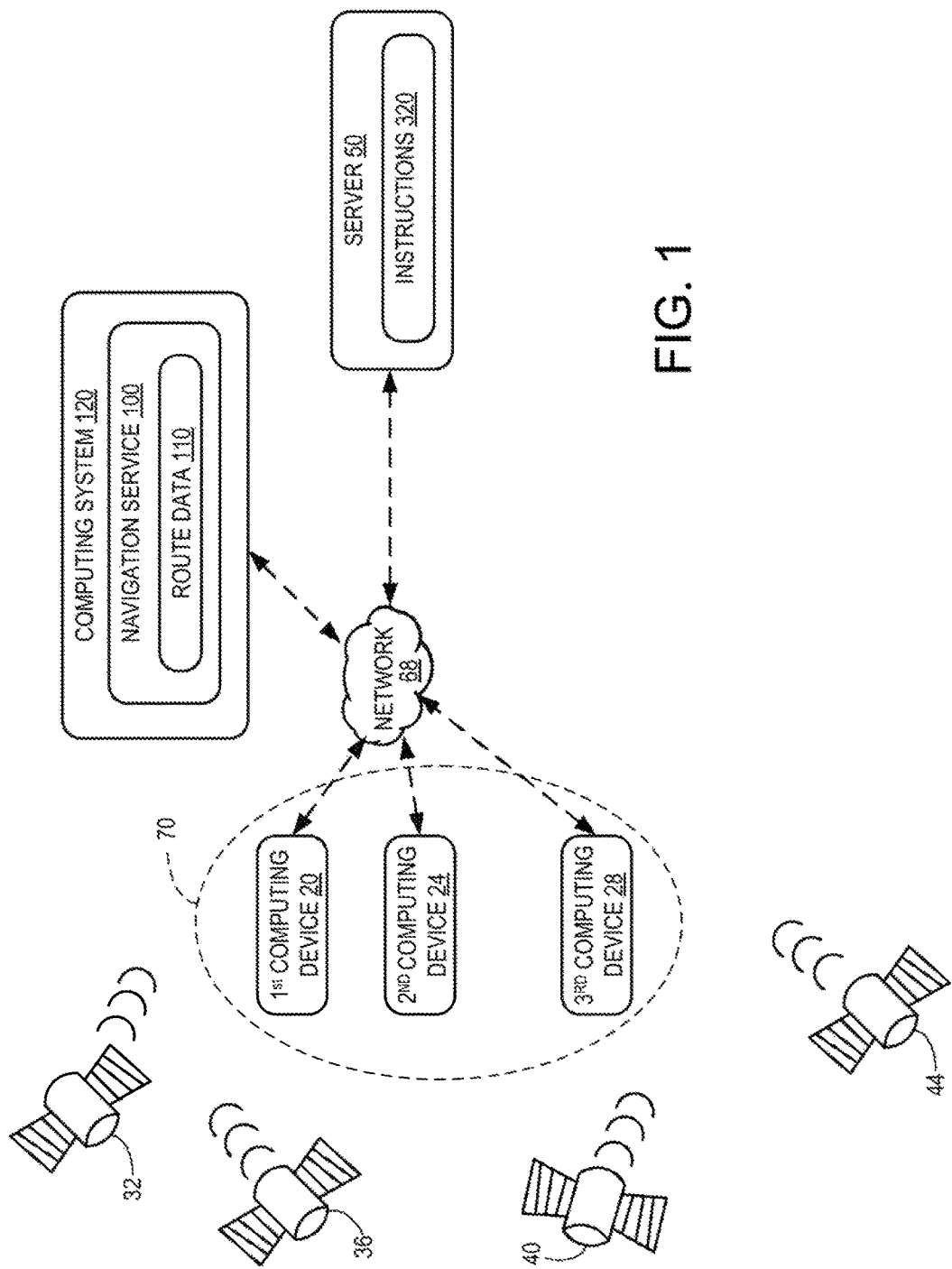
FIG. 1 is a block diagram of a server for cycling GPS computations among computing devices according to an example of the present disclosure.

FIG. 1 shows a block diagram of a server 50 for cycling GPS computations among computing devices according to an example of the present disclosure. As described in more detail below, the server 50 may include instructions for cycling GPS computations among computing devices that are members of a device group. In the example of FIG. 1, a device group 70 is composed of a first computing device 20, second computing device 24 and third computing device 28 that are each in communication with GPS satellites 32, 36, 40 and 44. More particularly, each of the first computing device 20, second computing device 24 and third computing device 28 includes GPS components that enable the device to receive and use GPS data from the GPS satellites to compute location data corresponding to its geographic location.

In the example of FIG. 1, each of the first computing device 20, second computing device 24 and third computing device 28 may be in communication with all four of the GPS satellites 32, 36, 40 and 44. In some examples, at least one of the first computing device 20, second computing device 24 and third computing device 28 may be in communication with any suitable number of GPS satellites. It will also be appreciated that a device group may include any suitable number of computing devices.

The server 50, first computing device 20, second computing device 24 and third computing device 28 may be communicatively coupled to at least one computing device or system comprising at least one processor for executing instructions of a navigation service, such as navigation service 100. The first computing device 20, second computing device 24 and third computing device 28 may utilize the navigation service 100 to receive turn-by-turn directions to a desired destination. The computing device or system that executes instructions of the navigation service 100 may receive user input of a desired destination and determine a route from a current location of a computing device to the desired destination. The route may include travel along multiple roads, thoroughfares, highways, and the like, along with at least one turn and/or exit. As described in more detail below, such route data 110 also may be utilized by the server 50 to determine which computing devices are members of a device group.

In the example of FIG. 1, the navigation service 100 may comprise computing system 120 for providing turn-by-turn directions to a desired destination. For example, computing system 120 may comprise a server or other computing device that is located remotely from server 50. In this example, the server 50 may receive route data 110 corresponding to the first computing device 20, second computing device 24 and third computing device 28 via network 68 from computing system 120 executing instructions of navigation service 100. In other examples, the navigation service 100 may comprise instructions that may be executed by at least one processor of the server 50 to perform various functions consistent with the disclosed examples. In some examples, two or more computing devices may utilize different navigation services. In these examples, the server 50 receives and processes route data from each of the different navigation services for the corresponding computing device.

Figure 2:
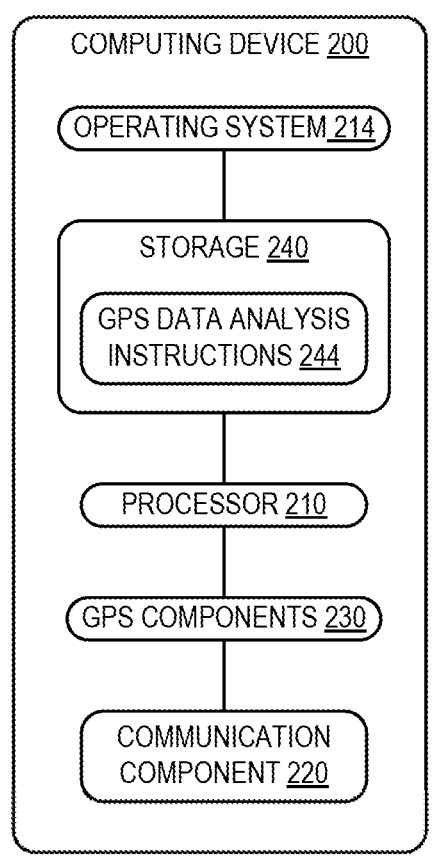
FIG. 2 is a block diagram of a computing device that may be utilized with the server of FIG. 1 according to an example of the present disclosure.

FIG. 2 shows a block diagram of an example computing device 200 that may be utilized with the server 50 according to examples disclosed herein. For example, at least one of first computing device 20, second computing device 24 and third computing device 28 may comprise computing device 200. Computing device 200 is shown in simplified form. In different examples, computing device 200 may take the form of a mobile phone, smart phone or other communication device, dedicated GPS receiver device, laptop, notebook or tablet computer, or other suitable type of computing device. Computing device 200 may include a processor 210 that is directed by an operating system 214.

The processor 210 may include at least one physical device configured to execute at least one instruction. For example, the processor 210 may be configured to execute instructions that are stored on a non-transitory machine-readable storage medium. Such instructions may be part of at least one application, service, program, routine, library, object, component, data structure, or other logical construct. Such instructions may be implemented to perform a task, implement a data type, transform the state of at least one device, or otherwise arrive at a desired result.

A communication component 220 may be configured to communicatively couple the computing device 200 with at least one network and/or at least one other computing device. Communication component 220 may include wired and/or wireless communication devices compatible with at least one communication protocol. In some examples, the communication component 220 may be configured for communication via a wireless telephone network, a wireless local area network, a wired local area network, a wireless wide area network, a wired wide area network, etc. In some examples, the communication component 220 may allow computing device 200 to send and receive data and messages to and/or from other devices via a network such as the Internet.

Computing device 200 includes GPS components 230 that enable the device to compute location data corresponding to its geographic location. The GPS components 230 may include, for example, a GPS antenna and RF circuitry for receiving GPS data from multiple GPS satellites. A GPS dock may provide clock signals for measuring the pseudo distance between the computing device 200 and a GPS satellite. GPS components 230 may also include an input/output interface for communicating GPS data to processor 210.

Computing device 200 may include storage 240 for storing instructions executable by the processor 210. Such instructions may include GPS data analysis instructions 244 that may be executed to analyze GPS data received from GPS satellites and the GPS components 230. By performing such GPS computations, the computing device 200 may determine its geographic location. It will be appreciated that other instructions stored in storage 240 may be executable by the processor 210 to perform other functions of the computing device 200.

In some examples, storage 240 may include non-transitory machine-readable storage media such as removable media and/or built-in devices, optical memory devices such as CD, DVD, HD-DVD, Blu-Ray Disc, and the like, semiconductor memory devices such as RAM, EPROM, EEPROM, and the like, and/or magnetic memory devices such as hard disk drive, floppy disk drive, tape drive, MRAM, and the like, among others. Storage 240 may include memory devices with at least one of the following characteristics: volatile, nonvolatile, dynamic, static, read/write, read-only, random access, sequential access, location addressable, file addressable, and content addressable.

Figure 3:
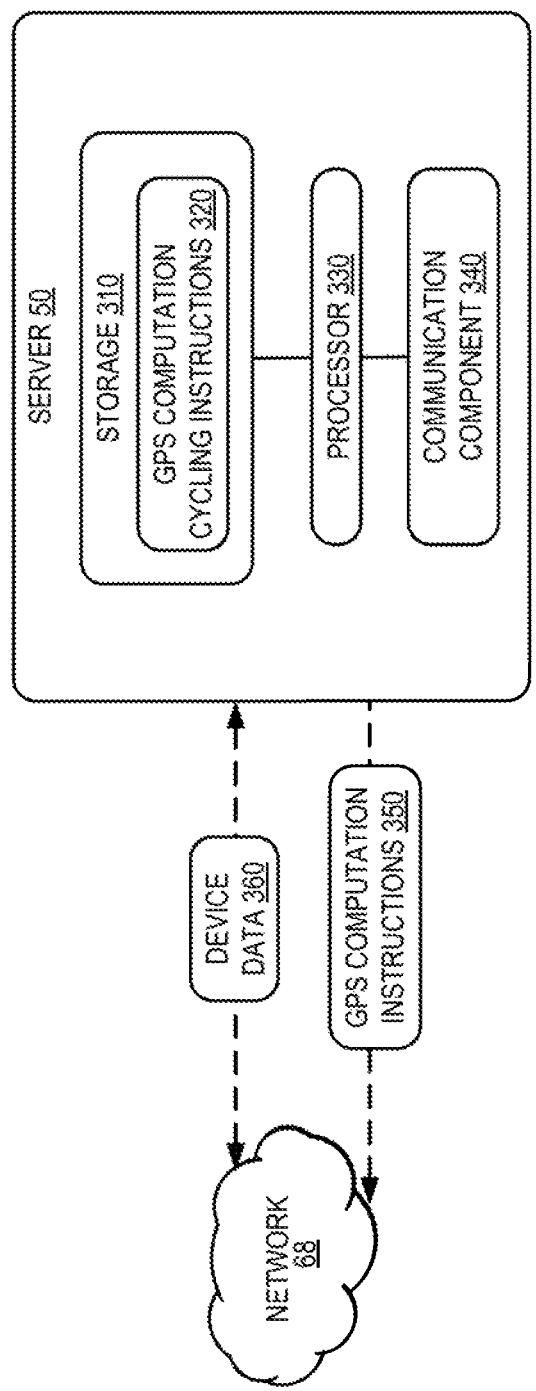
FIG. 3 is a block diagram of the server of FIG. 1 according to an example of the present disclosure.

With reference now to FIG. 3, a block diagram of an example of the server 50 of FIG. 1 is provided. As described in more detail below, in one example server 50 may include storage 310 containing GPS computation cycling instructions 320 for cycling GPS computations among a device group, such as device group 70 comprising the first computing device 20, second computing device 24 and third computing device 28. The GPS computation cycling instructions 320 may be encoded on a non-transitory machine-readable storage medium and executable by a processor 330. In some examples, processor 330 may comprise one, two or more processors. When executed, the GPS computation cycling instructions 320 may analyze device data 360 received from the first computing device 20, second computing device 24 and third computing device 28 via network 68. Device data 360 may include, but is not limited to, device location data and device velocity data. As described in more detail below, when executed the GPS computation cycling instructions 320 may distribute portions of device data 360, such as device location data, to computing devices that are members of a device group.

Other instructions in storage 310 may be executable by the processor 330 to perform other functions of the server 50. Such instructions may comprise at least one application, service, program, routine, library, object, component, data structure, or other logical construct. Such instructions may be implemented to perform a task, implement a data type, transform the state of at least one device, or otherwise arrive at a desired result. In addition or in other examples, server 50 may include at least one hardware device including electronic circuitry for implementing the functionality described herein.

As described above, storage 310 may include non-transitory machine-readable storage media such as removable media and/or built-in devices, optical memory devices such as CD, DVD, HD-DVD, Blu-Ray Disc, and the like, semiconductor memory devices such as RAM, EPROM, EEPROM, and the like, and/or magnetic memory devices such as hard disk drive, floppy disk drive, tape drive, MRAM, and the like, among others. Storage 310 may include memory devices with at least one of the following characteristics: volatile, nonvolatile, dynamic, static, read/write, read-only, random access, sequential access, location addressable, file addressable, and content addressable In the example shown in FIG. 3, server 50 includes a communication component 340 that is configured to communicatively couple the server 50 with at least one other computing device, such as the first computing device 20, second computing device 24 and third computing device 28, via at least one network, such as network 68. Communication component 340 may include wired and/or wireless communication devices compatible with at least one communication protocol. Network 68 may take the form of a local area network (LAN), wide area network (WAN), wired network, wireless network, or a combination thereof, and may include the Internet. In some examples, the communication component 340 may allow server 50 to send and receive data and messages to and from other devices via network 68.

As described in more detail below, and with reference to the examples of FIGS. 1 and 3, GPS computation cycling instructions 320 may be executed to establish a device group 70 that is composed of a number N of member computing devices. A device group may be defined in a manner that allows the server 60 to share device location data among members of the group. More particularly, a cycle may be established during which GPS computation instructions 350 are provided to members of the device group. The GPS computation instructions 350 may repeatedly cycle GPS computations among the members of the device group, and cause location data to be shared among the members of the group.

As described in more detail below, in some examples the GPS computation instructions 350 may cause each of the N members of a device group to perform a single GPS computation during a single cycle. At each of N points within the cycle, location data from one member device, the target device, may be communicated to the server 50. The server 50 may then share this target location data with the other members of the device group. A different member device may perform a GPS computation at each of the N points of the cycle. In this manner, the number of GPS computations performed by each computing device of the device group may be reduced, and the corresponding power efficiency and battery life of each device may be improved. Additionally, by sharing location data among members of the device group, the GPS computation cycling instructions 320 may enable each member device of the device group to maintain accurate current location data.

In some examples the temporal length of a cycle may correspond to a GPS sampling rate of a computing device. For example, if a GPS sampling rate of a computing device is 5 Hz., the temporal length of a cycle may be 0.2 sec. In this manner, shared location data may be distributed to each computing device of the device group at the same frequency as the GPS sampling rate. Accordingly, each device may maintain accurate current location data that may be utilized, for example, with a navigation service.

With reference now to FIG. 4, a block diagram of a non-transitory machine-readable storage medium 400 containing instructions for cycling GPS computations according to an example of the present disclosure is provided. In some examples, the non-transitory machine-readable storage medium 400 may comprise GPS computation cycling instructions 320. When executed by at least one processor, such as processor 330 of server 50, the GPS computation cycling instructions 320 may cycle GPS computations in a manner consistent with the following example and other examples described herein.

In this example and as described in more detail below, the instructions may include device group member determining instructions 404 to determine, at a beginning of a cycle, that N computing devices are members of a device group. The instructions may include instruction distribution instructions 408 to distribute, during the cycle, instructions among the N computing devices that cause each of the N devices to perform one GPS computation. The instructions may include location data receiving instructions 412 to receive, during the cycle, first location data computed by a first device of the device group. The instructions may further include location data transmitting instructions 416 to transmit, during the cycle, the first location data to a second device of the device group.

Figure 5:
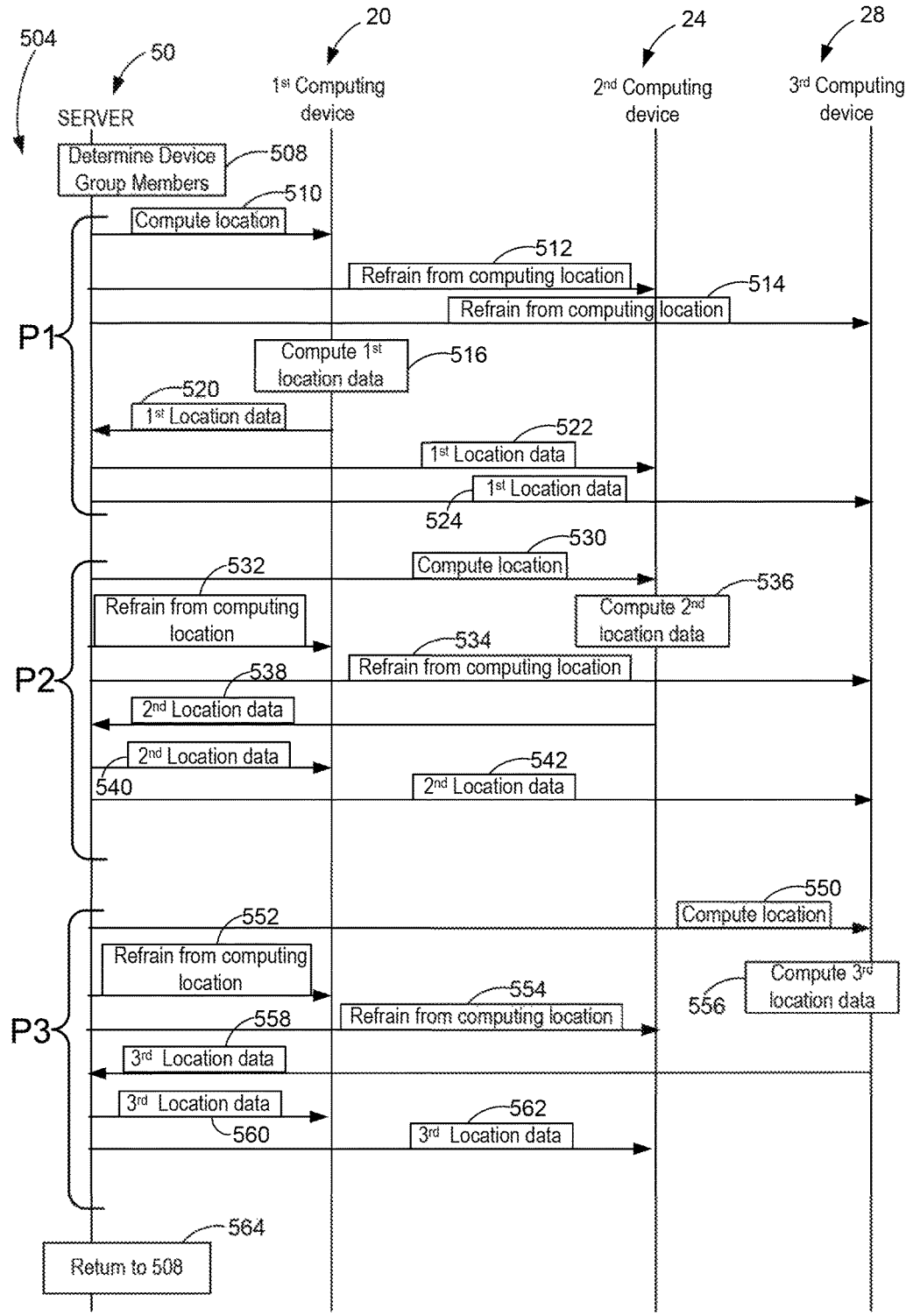
FIG. 5 is a diagram illustrating an example flow of cycling GPS computations among three computing devices according to an example of the present disclosure.
Figure 6:
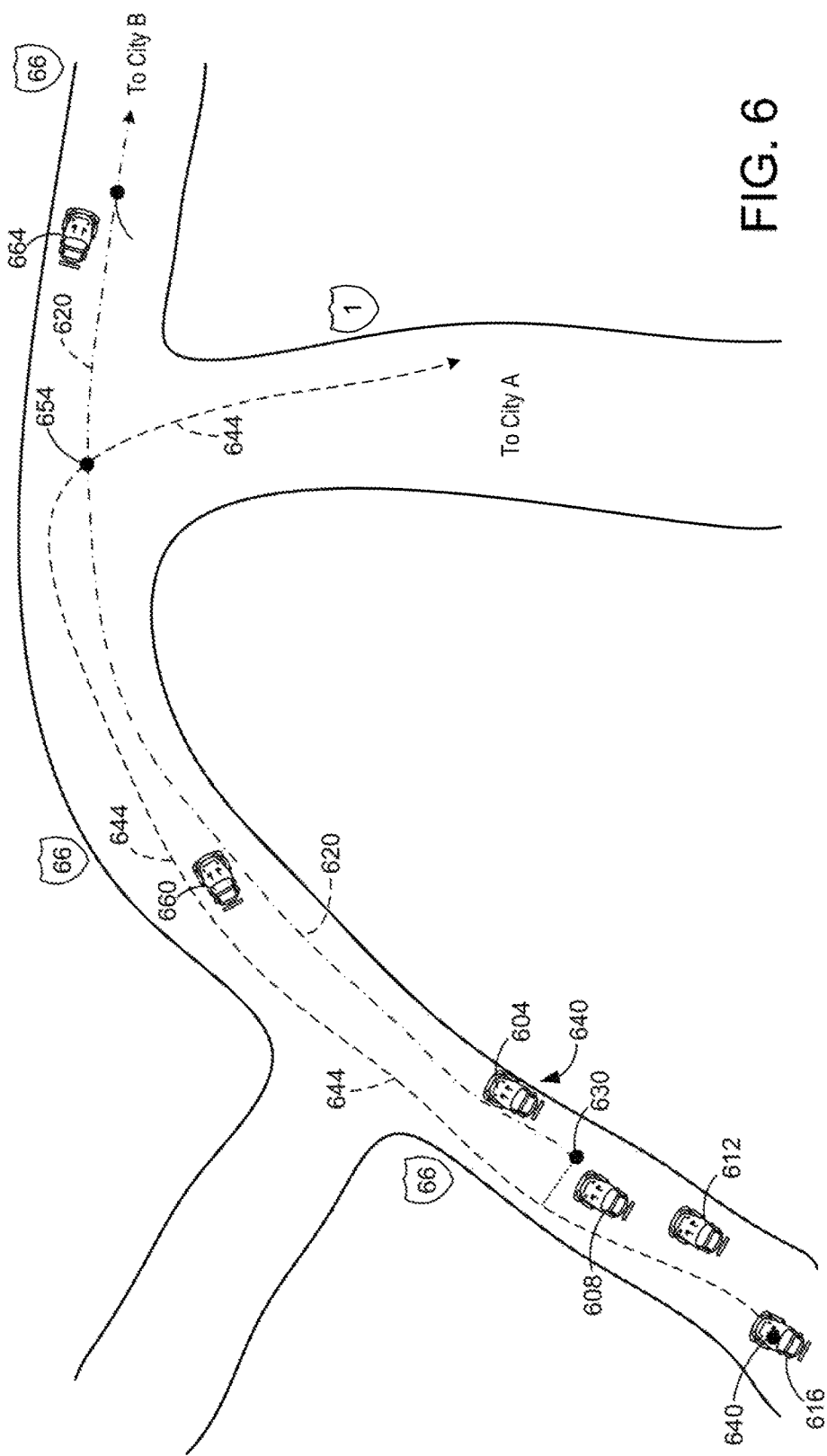
FIG. 6 is a schematic view of a highway showing a portion of a maximum sharing route of a device group according to an example of the present disclosure.
Figure 7:
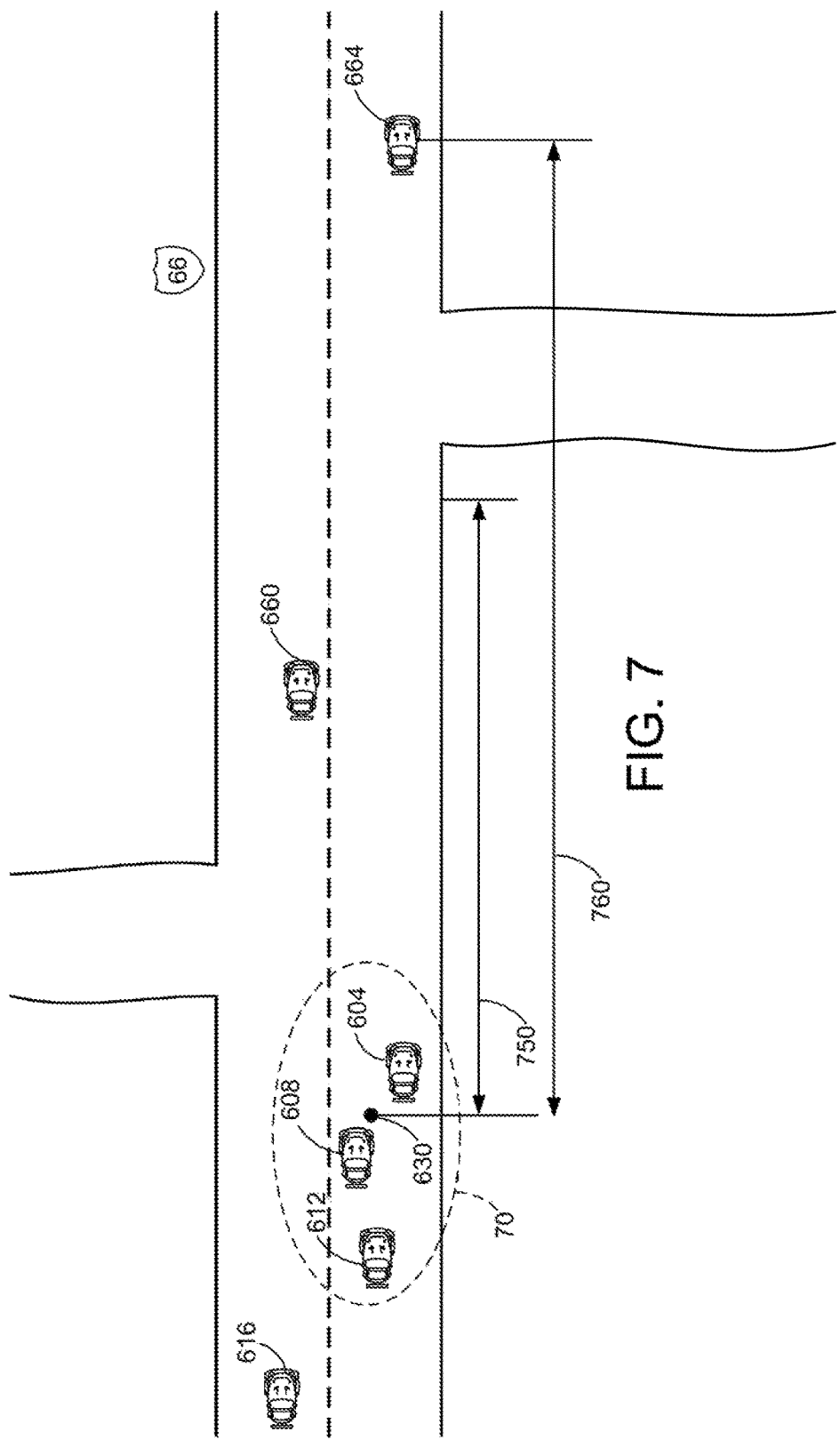
FIG. 7 is a schematic view of the highway of FIG. 5 showing linear distances along the highway between cars according to an example of the present disclosure.

With reference now to FIGS. 5, 6 and 7, example use cases of the present disclosure will now be described. In one example and with reference to FIG. 5, a diagram illustrating an example flow of cycling GPS computations among three computing devices according to an example of the present disclosure is provided. As shown in the example of FIG. 5, the server 50 may cycle GPS computations among 3 computing device that are members of a device group. In the example of FIG. 5, the device group is composed of the first computing device 20, second computing device 24 and third computing device 28. Accordingly, in this example the number N of members of the device group is N=3. It will be appreciated that in other examples, the number N may any suitable number greater than one.

With continued reference to FIG. 5 and as described in more detail below, the GPS computation cycling instructions 320 may be executed to establish a cycle 504 during which each of the first computing device 20, second computing device 24 and third computing device 28 performs one GPS computation during the cycle. Accordingly, in this example the cycle 504 includes N=3 points, indicated at P1, P2, and P3, at which one of the computing devices performs a GPS computation to compute its location. At each of these points in the cycle, the location data of a target device is shared with the other two devices of the device group.

At the beginning of cycle 504 and as indicated at 508, the server 50 determines whether the first computing device 20, second computing device 24 and third computing device 28 are members of a device group. To make such determinations and as described in more detail below, the server 50 may analyze route data for each computing device within a device group, such as the first computing device 20, second computing device 24 and third computing device 28.

As noted above, the computing devices may utilize a navigation service 100 to receive directions to a desired destination. The navigation service 100 may comprise instructions that, when executed by at least one processor of an associated computing device or system, determine a route from a current location of a computing device to a user-provided desired destination. The route may include travel along multiple roads, thoroughfares, highways, and the like, along with at least one turn and/or exit. As described in more detail below, such route data 110 may be accessed by the server 50 and utilized to determine which computing devices are members of a device group.

With reference now to FIG. 6, a schematic view of a highway showing a portion of a maximum sharing route of a device group according to an example of the present disclosure is provided. In one example, each of a first car 604, second car 608 and third car 612 are traveling along Highway 66. The first computing device 20 is located in the first car 604, the second computing device 24 is located in the second car 608, and the third computing device 28 is located in the third car 612. In each of the three cars, the computing device is receiving directions and route data 110 from navigation service 100.

In one example, each of the first computing device 20, second computing device 24 and third computing device 28 may receive the same directions to travel on Highway 66 to a destination of City B. Thus, each of the computing devices is expected to follow Highway 66 to City B. An initial device group composed of the first computing device 20, second computing device 24 and third computing device 28 may be formed based on the common routing of each of the computing devices to City B.

In some examples, a maximum sharing route of the initial device group may be determined. In the example of FIG. 6, the maximum sharing route of the first computing device 20, second computing device 24 and third computing device 28 is the route 620 from an average location 630 of these 3 computing devices to City B. As described in more detail below, the route of the first computing device 20 in first car 604 from its current location 640 to City B along Highway 66 overlaps the maximum sharing route 620 that also follows Highway 66 to City B. Because the route of the first computing device 20 overlaps the maximum sharing route 620, the first computing device is determined to be a member of the device group 70. Similarly, the routes of the second computing device 24 in second car 608 and the third computing device 28 in third car 612 overlap the maximum sharing route 620. Accordingly, the second computing device 24 and third computing device 28 also are determined to be members of the device group 70.

In some examples, to determine whether a computing device qualifies as a member of a device group, it may be determined whether the route of the computing device overlaps the maximum sharing route by at least a minimum overlap distance. With continued reference to FIG. 6, in one example and at the beginning of a cycle 504, the device group 70 is composed of the first computing device 20, second computing device 24 and third computing device 28 located in the first car 604, second car 608 and third car 612, respectively. A fourth computing device located in a fourth car 616 may be located at a fourth device location indicated at 640. As shown in FIG. 6, the fourth computing device has a fourth device route 644 that leads to a destination of City A. The fourth device route 644 initially follows Highway 66 and overlaps the maximum sharing route 620 until it exits at Highway 1 to proceed to City A. In this example, the fourth device route 644 overlaps the maximum sharing route 620 by an overlap distance along the maximum sharing route 620. In this example, the overlap distance along the maximum sharing route 620 is the distance between the average location 630 of device group and an overlap end location 654.

In various examples, the minimum overlap distance may be 50 m., 100 m., 200 m., 500 m., 1 km. or other suitable distance. With reference again to FIG. 6, in one example the minimum overlap distance may be 500 m. and the overlap distance between the average location 630 and the overlap end location 654 may be 200 m. Accordingly, in this example the fourth computing device would not be added as a member of the device group. In another example, the minimum overlap distance may be 200 m. and the overlap distance between the average location 630 and the overlap end location 654 may be 300 m. Accordingly, in this example the fourth computing device would be added as a member of the device group In some examples where a computing device has a route that overlaps the maximum sharing route by at least a minimum overlap distance, to determine whether a computing device qualifies as a member of a device group, it may be determined whether at least one of (1) a velocity of the device is within a threshold velocity of an average velocity of the device group, and (2) a position of the device is within a threshold distance of a group position of the device group. In various examples, a threshold velocity may be 5 km./hr., 10 km./hr., 20 km./hr., or other suitable velocity. In various examples, a threshold distance may be 50 m., 100 m, 200 m., or other suitable distance.

With reference now to FIG. 7, a schematic view showing linear distances along the Highway 66 between the cars of FIG. 6 according to an example of the present disclosure is provided. In one example, a threshold velocity may be 10 km./hr. At the beginning of a cycle 504, the fourth computing device in fourth car 616 may have a route that overlaps the maximum sharing route by at least a minimum overlap distance. In one example, an average velocity of the cars 604, 608 and 612 in device group 70 is 120 km/hr. A velocity of the fourth car 616 is 90 km/hr. In this example, the difference in velocities is 30 km/hr, which is not within the threshold velocity of 10 km/hr. Accordingly, the fourth computing device would not be added as a member of the device group 70. In another example, the threshold velocity may be 10 Km./hr. and an average velocity of the cars 604, 608 and 612 in device group 70 is 110 km/hr. A velocity of the fourth car 616 is 105 km/hr. In this example, the difference in velocities is 5 km./hr, which is within the threshold velocity of 10 km/hr. Accordingly, in this example the fourth computing device would be added as a member of the device group 70.

With continued reference to FIG. 7, in another example a threshold distance indicated at 750 may be 100 m. At the beginning of a cycle 504, a fifth computing device in a fifth car 660 may have a route that overlaps the maximum sharing route by at least a minimum overlap distance. In one example and as shown in FIG. 7, the position of the fifth car 660 is within the threshold distance 750 of the group position at the average location 630 of the device group 70. Accordingly, the fifth computing device would be added as a member of the device group 70.

In another example, at the beginning of a cycle 504 a sixth computing device in a sixth car 664 may have a route that overlaps the maximum sharing route by at least a minimum overlap distance. In this example and as shown in FIG. 7, the position of the sixth car 664 is spaced by a distance 760 from the group position at the average location 630 of the device group. As the distance 760 is not within the threshold distance 750, the sixth computing device would not be added as a member of the device group 70.

In some examples, to be added as a member of a device group, a computing device would need to meet all three of the above-described criteria: (1) have a route that overlaps the maximum sharing route by at least a minimum overlap distance; (2) have a velocity that is within a threshold velocity of an average velocity of the device group; and (3) have a position that is within a threshold distance of a group position of the device group.

In some examples, determining which computing devices are members of a device group may be described by the following expressions:

$$\text{Route}=R=\{e_1, \ldots, e_n | \forall (e_i, e_{i+1}) \Leftrightarrow ((v_j, v_i),(v_i, v_k))\} \quad (1)$$

where e is a road between two intersections, and v is an intersection (point location) along Route R.

$$\text{Device Route}=DR=(R|R \text{ is route of device from points } a \text{ to } b\} \quad (2)$$

$$\text{Sharing Route}_{DR_i, DR_j}=SR_{DR_i, DR_j}=\{R|R \subseteq DR_i \cap R \subseteq DR_j\} \quad (3)$$

$$\bigcap_{\substack{i=0,\\j=0}}^{n} SR_{DR_i, DR_j} \quad (4)$$

Maximum sharing route of device group=MSRG (5)

$$MSRG = \text{the maximum } R \text{ group in } \bigcap_{\substack{i=0,\\j=0}}^{n} SR_{DR_i, DR_j}$$

$$\text{DeviceData}=\{(R,V,P)|R=DR, V \text{ is the speed}, P \text{ is the location}\} \quad (6)$$

$$\text{Sharing Group}=\{(D_1,R,V,P), \ldots ,(D_n,R,V,P)|D \text{ is the device}, R=DR, V \text{ is the average speed}, P \text{ is the average location}\} \quad (7)$$

Device∈Sharing Group ⇔

$$\{\neg R \in DR | R \subseteq MSRG, D_{R \cap MSRG} \geq mSR,$$

$$|V-V_{SG}| \leq V_{threshold}, |P-P_{SG}| \leq P_{threshold}\} \quad (8)$$

Using the above expressions, it may be determined whether a given computing device is a member of a Sharing Group using the following expression:
1. Each Device is a standalone Sharing Group (SSG)
2. For each Device:
 2.1 If Device is a SSG
  2.1.1 If ¬ SG that Device∈Sharing Group then
   2.1.1.1 Add the Device to Sharing Group
 2.2 Else (Device e Sharing Group on the last cycle)
  2.2.1 If the device is still meets the Sharing Group conditions
   2.2.1.1 Continue
  2.2.2 Else
   2.2.2.1 Device is a SSG Returning now to FIG. 5, a description of the flow of cycling GPS computations among three computing devices according to an example of the present disclosure will now be provided. In this example, the members of a device group are determined to be the first computing device 20, second computing device 24 and third computing device 28. At a first point P1 within cycle 504, at 510 the server 50 instructs the first computing device 20 to compute its first location data. At 512 the server 50 instructs the second computing device 24 to refrain from computing its second location data. At 514 the server 50 instructs the third computing device 28 to refrain from computing its third location data.

At 516 the first computing device 20 utilizes GPS data to compute its first location data. At 520 the first computing device provides the first location data to the server 50. After receiving the first location data, at 522 the server 50 transmits the first location data to the second computing device 24, and at 524 transmits the first location data to the third computing device 28.

At a second point P2 within cycle 504, at 530 the server 50 instructs the second computing device 24 to compute its second location data. At 532 the server 50 instructs the first computing device 20 to refrain from computing its first location data. At 534 the server 50 instructs the third computing device 28 to refrain from computing its third location data.

At 536 the second computing device 24 utilizes GPS data to compute its second location data. At 538 the second computing device provides the second location data to the server 50. After receiving the second location data, at 540 the server 50 transmits the second location data to the first computing device 20, and at 542 transmits the second location data to the third computing device 28.

At a third point P3 within cycle 504, at 550 the server 50 instructs the third computing device 28 to compute its third location data. At 552 the server 50 instructs the first computing device 20 to refrain from computing its first location data. At 554 the server 50 instructs the second computing device 28 to refrain from computing its second location data.

At 556 the third computing device 28 utilizes GPS data to compute its third location data. At 558 the third computing device provides the third location data to the server 50. After receiving the third location data, at 560 the server 50 transmits the third location data to the first computing device 20, and at 562 transmits the third location data to the second computing device 24.

After the third point P3 at an endpoint 564 of the cycle 504, the server 50 may return to 508 and again determine which computing devices are members of the device group. For example the server 50 may determine whether each of the first computing device 20, second computing device 24, third computing device 28, and at least one other computing device are members of the device group. The server 50 may then proceed to cycle GPS computations among the members of the device group as described above.

In other examples, the order in which the computing devices are instructed to compute their locations may be varied. For example, in the example of FIG. 5 at point P1 the second computing device 24 may be instructed to compute its location data, while the first computing device 20 and third computing device 28 are each instructed to refrain from computing their location data.

Accordingly and as described above, by repeatedly determining members of a device group and cycling GPS computations among the members, the server 50 of the present disclosure may enable such devices to reduce power consumption and conserve battery life. Alternatively expressed, by instructing each device of a device group to perform a single GPS computation in each cycle, the number of GPS computations performed by each computing device may be reduced, and the corresponding power efficiency and battery life of each device may be improved.

In some examples, the server 50 may instruct at least one computing device of a device group to refrain from performing any GPS computations during at least one cycle. For example, the server 50 may instruct a computing device to refrain from performing a GPS computation during a cycle based on an operational parameter of the device. In some examples, the operational parameter may be a battery level of the device. In one example, if the battery level of a computing device is below a threshold battery level, then the server 50 may instruct the device to refrain from performing any GPS computations until the battery level of the device increases to reach the threshold battery level. In various examples, a threshold battery level may be 3%, 5%, 7%, 10% or any suitable level.

Figure 8:
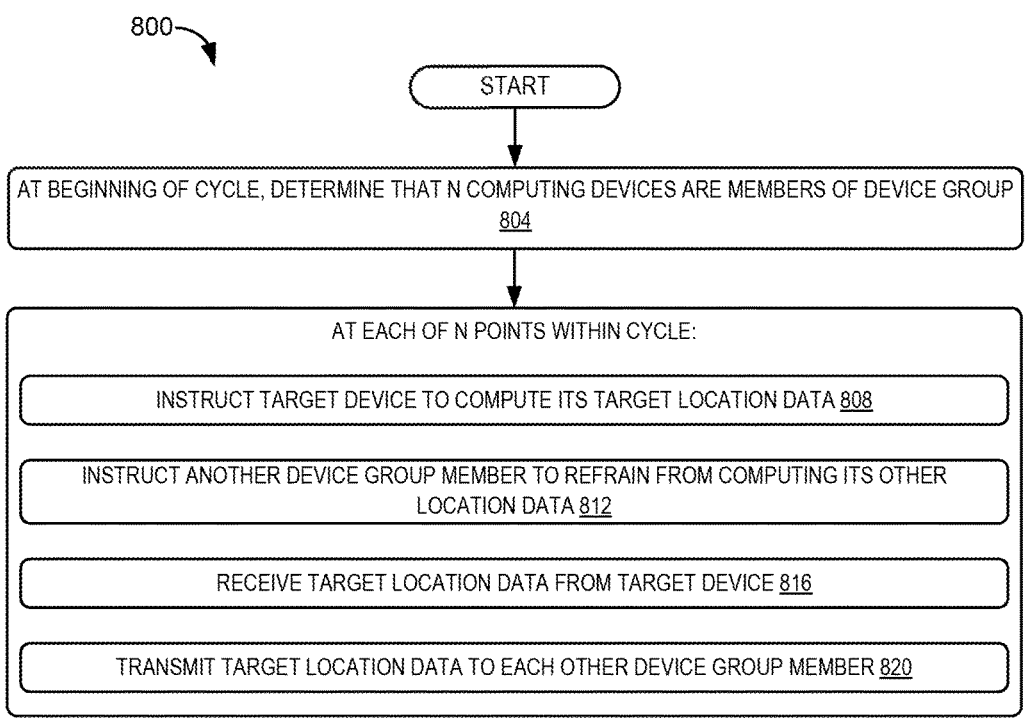
FIG. 8 is a flow chart of a method for cycling GPS computations according to an example of the present disclosure

Turning now to FIG. 8, a flow chart of a method 800 for cycling GPS computations according to another example of the present disclosure is provided. As noted above with respect to FIGS. 1-3, in some examples at least one processor 330 of server 50 may execute GPS computation cycling instructions 320 to determine members of a device group that may comprise three computing devices. Such instructions also may be executed to cycle GPS computations among the three devices. As described in more detail below, the example method of FIG. 8 may cycle GPS computations among a number N of computing devices, where N is any suitable number of computing devices.

The following description of method 800 is provided with reference to the software and hardware components described above and shown in FIGS. 1-7. The method 800 may be executed in the form of instructions encoded on a non-transitory machine-readable storage medium that is executable by a processor. It will be appreciated that method 800 may also be performed in other contexts using other suitable hardware and software components.

With reference to FIG. 8, at 804 the method 800 may include, at a beginning of a cycle, determining that N computing devices are members of a device group. In the examples of FIGS. 1-3 the number N=3, corresponding to the first computing device 20, second computing device 24 and third computing device 28. In other examples, N may be any suitable number of computing devices. At each of N points within the cycle, the method 800 may include, at 808 instructing a target device of the N computing devices to compute its target location data; at 812 instructing another member of the device group to refrain from computing its other location data; at 816 receiving the target location data from the target device; and at 820 transmitting the target location data to each other member of the device group.

It will be appreciated that method 800 is provided by way of example and is not meant to be limiting. Therefore, it is to be understood that method 800 may include additional and/or other steps than those illustrated in FIG. 8. Further, it is to be understood that method 800 may be performed in any suitable order. Further still, it is to be understood that at least one step may be omitted from method 800 without departing from the scope of this disclosure.

Figure 9A:
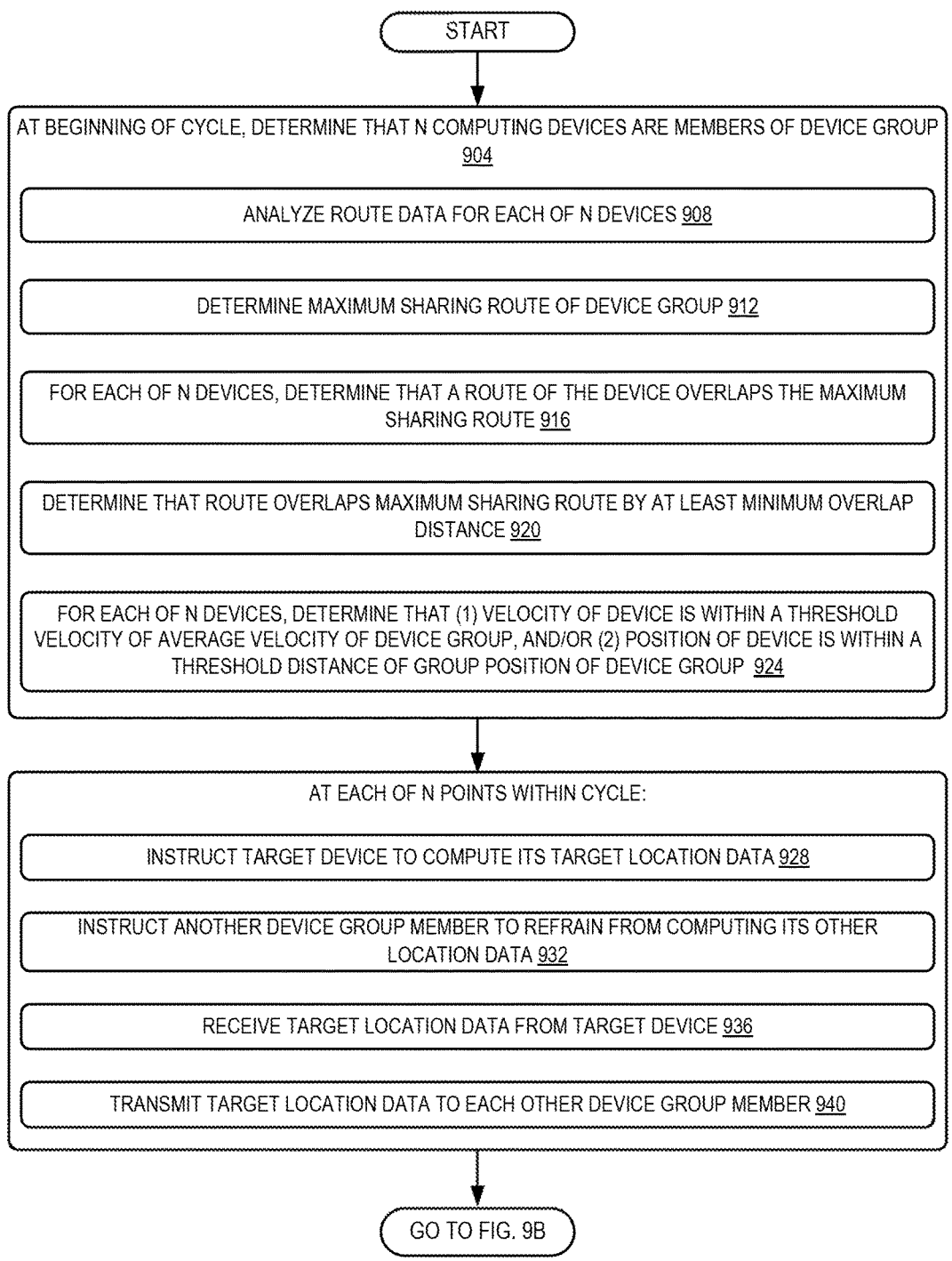
FIGS. 9A and 9B are a flow chart of a method for cycling GPS computations according to an example of the present disclosure.
Figure 9B:
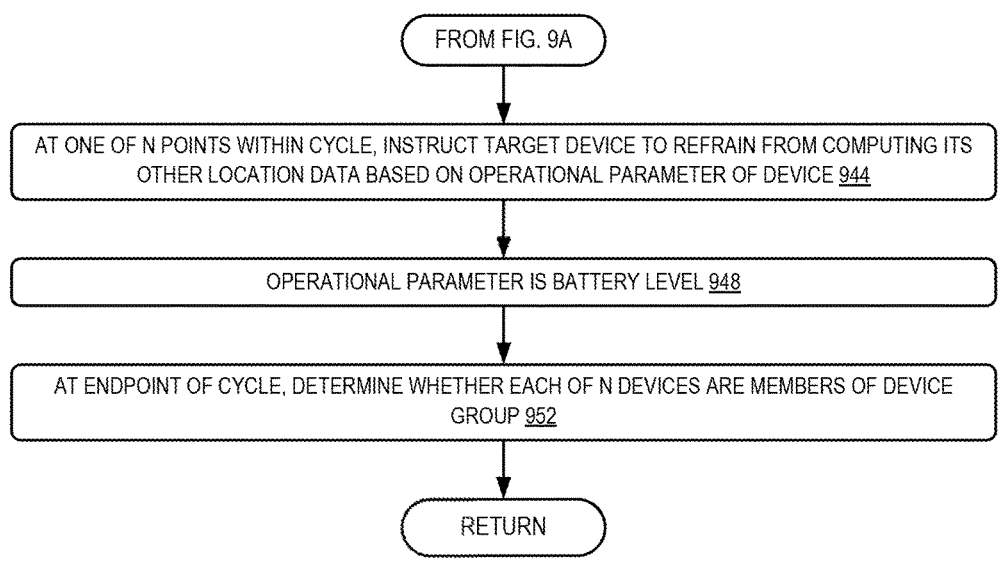

Turning now to FIGS. 9A and 9B, a flow chart of a method 900 for cycling GPS computations according to another example of the present disclosure is provided. The flow chart of FIGS. 9A and 9B illustrates an example method that may cycle GPS computations among computing devices in a manner similar to the flow shown in FIG. 5 and described above. As described in more detail below, the example method of FIGS. 9A and 9B may cycle GPS computations among a number N of computing devices, where N is any suitable number of computing devices.

The following description of method 900 is provided with reference to the software and hardware components described above and shown in FIGS. 1-7. The method 900 may be executed in the form of instructions encoded on a non-transitory machine-readable storage medium that is executable by a processor. It will be appreciated that method 900 may also be performed in other contexts using other suitable hardware and software components.

With reference to FIG. 9, at 904 the method 900 may include, at a beginning of a cycle, determining that N computing devices are members of a device group. As noted above, in the examples of FIGS. 1-3 the number N=3. In other examples, N may be any suitable number of computing devices. To determine that the N computing devices are members of the device group, at 908 the method 900 may include analyzing route data for each of the N computing devices. To determine that the N computing devices are members of the device group, at 912 the method 900 may include determining a maximum sharing route of the device group. At 916 the method 900 may include, for each of the N computing devices, determining that a route of the computing device overlaps the maximum sharing route. To determine that a route of the computing device overlaps the maximum sharing route, at 920 the method 900 may include determining that the route overlaps the maximum sharing route by at least a minimum overlap distance.

To determine that the N computing devices are members of the device group, at 924 the method 900 may include determining, for each of the N computing devices, at least one of (1) that a velocity of the computing device is within a threshold velocity of an average velocity of the device group, and (2) that a position of the computing device is within a threshold distance of a group position of the device group.

The method 900 may include, at each of N points within the cycle: at 928 instructing a target device of the N computing devices to compute its target location data; at 932 instructing another member of the device group to refrain from computing its other location data; a 936 receiving the target location data from the target device; and at 940 transmitting the target location data to each other member of the device group.

With reference now to FIG. 9B, the method 900 may include, at one of the N points within the cycle, instructing the target device to refrain from computing its target location data based on an operational parameter of the target device. At 948, the method 900 may include wherein the operational parameter is a battery level of the target device. At 952 the method 900 may include, at an endpoint of the cycle, determining whether each of the N computing devices are members of the device group.

It will be appreciated that method 900 is provided by way of example and is not meant to be limiting. Therefore, it is to be understood that method 900 may include additional and/or other steps than those illustrated in FIG. 9. Further, it is to be understood that method 900 may be performed in any suitable order. Further still, it is to be understood that at least one step may be omitted from method 900 without departing from the scope of this disclosure.

The invention claimed is:

1. A method executed by at least one processor for cycling global positioning service (GPS) computations, the method comprising:
    at a beginning of a cycle, determining that a number of computing devices are members of a device group sharing device location data based on a maximum sharing route for the number of computing devices, wherein the maximum sharing route is determined by:
        calculating an average location of the number of computing devices;
        determining a destination location associated with the number of computing devices; and
        calculating the maximum sharing route using the average location of the number of computing devices and the destination location associated with the number of computing devices, and wherein the number of computing devices is a plurality; and at each of a number of points within the cycle, the number of points within the cycle is equal to the number of computing devices:
instructing a target device of the number of computing devices to compute location data for the target device;
instructing a second device of the number of computing devices to refrain from continuously operating GPS components on the second device to compute updated location data for the second device;
receiving the location data for the target device; and
transmitting the location data for the target device to the second device.

2. The method of claim 1, wherein determining that the number of computing devices are members of the device group further comprises analyzing route data for each of the number of computing devices.

3. The method of claim 1, wherein determining that the number of computing devices are members of the device group further comprises determining that a route of each of the number of computing devices overlaps the maximum sharing route.

4. The method of claim 3, wherein determining that the route of each of the number of computing devices overlaps the maximum sharing route comprises determining that the route of each of the number of computing devices overlaps the maximum sharing route by at least a minimum overlap distance.

5. The method of claim 1, wherein determining that the number of computing devices are members of the device group further comprises, for each of the number of computing devices, determining a velocity of each of the number of computing devices is within a threshold velocity of an average velocity of other devices of the number of computing devices.

6. The method of claim 1, comprising:
at an endpoint of the cycle, determining again that each of the number of computing devices are members of the device group.

7. The method of claim 1, comprising:
at one of the number of points within the cycle, instructing the target device to refrain from computing the location data for the target device based on an operational parameter of the target device.

8. The method of claim 7, wherein the operational parameter of the target device is a battery level.

9. A server, comprising:
a processor;
a storage device coupled to the processor;
a communication device to receive location data from computing devices; and
the processor to:
at a beginning of a cycle, determine that a first computing device and a second computing device are members of a device group sharing device location data including determining based on a maximum sharing route for the first computing device and the second computing device, and wherein to determine the maximum sharing route, the processor is further to:
calculate an average location of the first computing device and the second computing device,
determine a destination location associated with the first computing device and the second computing device, and
calculate the maximum sharing route using the average location of the first computing device and the second computing device and the destination location associated with the first computing device and the second computing device;
at a first point within the cycle:
instruct the first computing device to compute location data for the first computing device;
receive the location data for the first computing device without receiving other location data from the second computing device; and
transmit the location data for the first computing device to at least the second computing device; and
at a second point within the cycle:
instruct the second computing device to compute location data for the second computing device;
receive the location data for the second computing device without receiving other location data from the first computing device; and
transmit the location data for the second computing device to at least the first computing device.

10. The server in accordance with claim 9, wherein to determine that the first computing device and the second computing device are members of the device group, the processor analyzes route data for the first computing device and route data for the second computing device.

11. The server in accordance with claim 9, wherein to determine that the first computing device and the second computing device are members of the device group, the processor determines that a route for the first computing device and a route for the second computing device overlap the maximum sharing route.

12. The server in accordance with claim 11, wherein to determine that the route for the first computing device and the route for the second computing device overlap the maximum sharing route, the processor determines that the route for the first computing device and the route for the second computing device overlap the maximum sharing route by at least a minimum overlap distance.

13. The server in accordance with claim 9, wherein to determine that the first computing device is a member of the device group, the processor determines at least one of (1) a velocity of the first computing device is within a threshold velocity of an average velocity of other members of the device group, and (2) a position of the first computing device is within a threshold distance of a group position of the other members of the device group.

14. The server in accordance with claim 9, wherein the processor is to:
at a third point within the cycle, instruct a third computing device to refrain from computing location data for the third computing device based on a battery level of the third computing device, wherein the third computing device is a member of the device group.

15. A non-transitory machine-readable storage medium storing machine-readable instructions executable by a processor, the machine-readable instructions comprising:
device group member determining instructions executable by the processor to determine, at a beginning of a cycle, that a number of computing devices are members of a device group sharing device location data based on a maximum sharing route of the number of computing devices, and wherein to determine the maximum sharing route, the machine-readable instructions are further executable by the processor to:

calculate an average location of the number of computing devices;

determine a destination location associated with the number of computing devices; and calculate the maximum sharing route using the average location of the number of computing devices and the destination location associated with the number of computing devices, and wherein the number of computing devices is a plurality;

distribution instructions executable by the processor to distribute, during the cycle, instructions among the number of computing devices that cause each of the number of computing devices to perform one global positioning system (GPS) computation;

location data receiving instructions executable by the processor to receive, during the cycle, location data computed by a first device of the device group; and location data transmitting instructions executable by the processor to transmit, during the cycle, the location data computed by the first device to a second device of the device group.

16. The non-transitory machine-readable storage medium of claim 15, wherein the device group member determining instructions are further executable by the processor to analyze route data for each of the number of computing devices.

17. The non-transitory machine-readable storage medium of claim 15, wherein the device group member determining instructions are further executable by the processor to determine that a route of each of the number of computing devices overlaps the maximum sharing route.

18. The non-transitory machine-readable storage medium of claim 17, wherein the device group member determining instructions are further executable by the processor to determine that the route of each of the number of computing devices overlaps the maximum sharing route by at least a minimum overlap distance.

19. The non-transitory machine-readable storage medium of claim 15, wherein the machine-readable instructions are further executable by the processor to instruct the first device to refrain from continuously operating global positioning service (GPS) components on the second device to compute updated location data based on an operational parameter of the first device.

20. The non-transitory machine-readable storage medium of claim 19, wherein the operational parameter of the first device is a battery level.

* * * * *